United States Patent
Huang et al.

(10) Patent No.: US 12,415,750 B1
(45) Date of Patent: Sep. 16, 2025

(54) SCRATCH-RESISTANT ANTI-GLARE MICROCRYSTALLINE GLASS, PREPARATION METHOD AND APPLICATION THEREOF

(71) Applicant: Zhongshan FODA Electrical Technology Co., Ltd., Zhongshan (CN)

(72) Inventors: Yonghui Huang, Zhongshan (CN); Bing Zhang, Zhongshan (CN); Jiawei Zhang, Zhongshan (CN)

(73) Assignee: Zhongshan FODA Electrical Technology Co., Ltd., Zhongshan (CN)

( * ) Notice: Subject to any disclaimer, the term of this patent is extended or adjusted under 35 U.S.C. 154(b) by 0 days.

(21) Appl. No.: 19/013,293

(22) Filed: Jan. 8, 2025

(30) Foreign Application Priority Data

Jul. 26, 2024 (CN) .......................... 202411014304.3

(51) Int. Cl.
*C03C 19/00* (2006.01)
(52) U.S. Cl.
CPC .................................. *C03C 19/00* (2013.01)
(58) Field of Classification Search
CPC ........... C03C 19/00; B24C 1/08; B24C 1/083; B24C 1/086; B24C 1/04
See application file for complete search history.

(56) References Cited

U.S. PATENT DOCUMENTS 6,159,257 A * 12/2000 Koutlakis ............ C09K 3/1409
51/293

2004/0157532 A1 * 8/2004 Koutlakis ................. C08L 3/02
106/206.1

(Continued)

FOREIGN PATENT DOCUMENTS

| CN | 104445978 A | 3/2015 |
|----|-------------|--------|
| CN | 107088827 A | 8/2017 |
| CN | 110655333 A | 1/2020 |

(Continued)

OTHER PUBLICATIONS

First Office Action issued in counterpart Chinese Patent Application No. 202411014304.3, dated Dec. 17, 2024.

(Continued)

*Primary Examiner* — Joel D Crandall
(74) *Attorney, Agent, or Firm* — Westbridge IP LLC

(57) ABSTRACT

Disclosed are a scratch-resistant (anti-glare) AG microcrystalline glass and a preparation method and application thereof. The preparation method for the scratch-resistant AG microcrystalline glass includes: cleaning and drying the raw sheet of microcrystalline glass (including the uncrystallized plate green wave plate and the crystallized plate), without polishing the rough plate (also use the polishing plate) and edge grinding pretreatment; letting the dried microcrystalline glass (including the uncrystallized plate green wave plate and the crystallized plate) pass through a horizontal sandblasting machine to obtain the sandblasted microcrystalline glass; high-pressure cleaning the sandblasted microcrystalline glass, pickling, polishing and cleaning the surface using the immersion pickling process and the tunnel plane pickling process, repeating the pickling, polishing and cleaning 2 to 8 times, and drying, to obtain the scratch-resistant AG microcrystalline glass.

9 Claims, 2 Drawing Sheets

(56) References Cited

U.S. PATENT DOCUMENTS

2010/0136884 A1* 6/2010 Oh .................... B24B 49/16
  451/280
2019/0219739 A1* 7/2019 Gregorski ........... C03C 17/3435

FOREIGN PATENT DOCUMENTS

| CN | 111138083 A | 5/2020 |
| CN | 111233343 A | 6/2020 |
| CN | 116375351 A | 7/2023 |

OTHER PUBLICATIONS

Second Office Action issued in counterpart Chinese Patent Application No. 202411014304.3, dated Jan. 17, 2025.

* cited by examiner

Pickling and polishing includes: spraying, via the pickling device, the reagent on the surface of the microcrystalline glass, and polishing the microcrystalline glass — S31

SCRATCH-RESISTANT ANTI-GLARE MICROCRYSTALLINE GLASS, PREPARATION METHOD AND APPLICATION THEREOF

CROSS-REFERENCE TO RELATED APPLICATIONS

This application claims priority to Chinese Patent Application No. 202411014304.3, filed on Jul. 26, 2024, the entire contents of which are incorporated herein by reference.

TECHNICAL FIELD

The present application relates to the technical field of microcrystalline glass processing, and in particular to a scratch-resistant anti-glare microcrystalline glass, a preparation method and application thereof.

BACKGROUND

Microcrystalline glass, also known as glass ceramic, is a material with a microcrystalline phase formed by special processing of glass. It combines the advantages of glass and ceramics, such as high mechanical strength, good thermal stability, and chemical corrosion resistance, making it widely used in many fields, especially in the manufacture of high-end home appliances and electronic products. Etched anti-glare (AG) microcrystalline glass technology is a surface treatment process that forms a uniform AG etching coating on the surface of microcrystalline glass by sandblasting and acid etching. The surface of the AG etching coating presents a fine roughness, which helps to scatter reflected light, reduce glare and fingerprints, and maintain high light transmittance. This treatment can significantly improve the surface texture and visual effect of microcrystalline glass, reduce direct reflection of light, and provide users with a more comfortable visual experience.

However, the surface scratch resistance of the microcrystalline glass obtained by the current AG microcrystalline glass surface treatment technology is poor.

SUMMARY

In view of the above-mentioned deficiencies in the related art, the present application proposes a scratch-resistant anti-glare (AG) microcrystalline glass, a preparation method and application therefor, aiming to solve the problem of poor surface scratch resistance of microcrystalline glass obtained by the current AG microcrystalline glass surface treatment technology.

To achieve the above-mentioned purpose, the present application proposes a preparation method for the scratch-resistant AG microcrystalline glass, including:
cleaning and drying a raw sheet of microcrystalline glass, without polishing and edge grinding pretreatment;
passing the dried microcrystalline glass through a horizontal sandblasting machine to obtain a sandblasted microcrystalline glass; and
pickling, polishing and cleaning the sandblasted microcrystalline glass, repeating the pickling, polishing and cleaning 2 to 8 times, and drying, to obtain a scratch-resistant AG microcrystalline glass.

In an embodiment, a drying temperature is 30° C. to 40° C.

In an embodiment, a rotation speed of the horizontal sandblasting machine is 600 rpm to 900 rpm.

In an embodiment, using the horizontal sandblasting machine includes: using 35-mesh to 45-mesh corundum to sand a surface of the microcrystalline glass for 5 minutes to 10 minutes.

In an embodiment, the pickling and polishing includes: spraying, via a pickling device, a reagent on a surface of the microcrystalline glass, and polishing the microcrystalline glass.

In an embodiment, in parts by weight, reagents used in the pickling and polishing includes: 20 to 30 parts of water, 15 to 25 parts of ammonium sulfate, 20 to 30 parts of barium sulfate, 12 to 16 parts of oxalic acid and 15 to 18 parts of ammonium acetofluoride.

In an embodiment, the spraying is achieved by a pump, and a pressure of the pump is 0.2 Mpa~0.5 Mpa.

In an embodiment, a time for the polishing is 6 minutes to 8 minutes.

In an embodiment, the cleaning and drying the raw sheet of microcrystalline glass, without polishing and edge grinding pretreatment includes:
cleaning and drying the raw sheet of microcrystalline glass, and using a polishing plate and edge grinding pretreatment.

In an embodiment, the raw sheet of microcrystalline glass includes an uncrystallized green wave plate and a crystallized plate.

In an embodiment, the microcrystalline glass includes an uncrystallized plate green wave plate, and a crystallized plate.

In an embodiment, the pickling, polishing and cleaning the sandblasted microcrystalline glass includes:
high-pressure cleaning the sandblasted microcrystalline glass, and pickling, polishing and cleaning a surface using an immersion pickling process and a tunnel plane pickling process.

In order to achieve the above objective, the present application further provides a scratch-resistant AG microcrystalline glass, which is prepared by the above preparation method.

In order to achieve the above objective, the present application further provides an application of the scratch-resistant AG microcrystalline glass, the scratch-resistant AG microcrystalline glass is used in household appliances, and the household appliances include one of an induction cooker, an electric ceramic stove, a microwave oven, a gas stove, and a tea stove.

The preparation method for the scratch-resistant AG microcrystalline glass provided by the present application does not use a sandblasting process to avoid the generation of burrs in the process of spraying brown corundum (sand) on the surface of the glass with high pressure, but adopts a horizontal sandblasting machine and a grinding process in combination, and prepares an acid pickling agent. By performing surface treatment on the raw sheet of microcrystalline glass, a microcrystalline glass with enhanced scratch resistance, wear resistance, and fingerprint resistance is obtained, which can be used in the panel of household appliances without being scratched, and greatly saves the preparation cost.

DETAILED DESCRIPTION OF THE EMBODIMENTS

Figure 1:
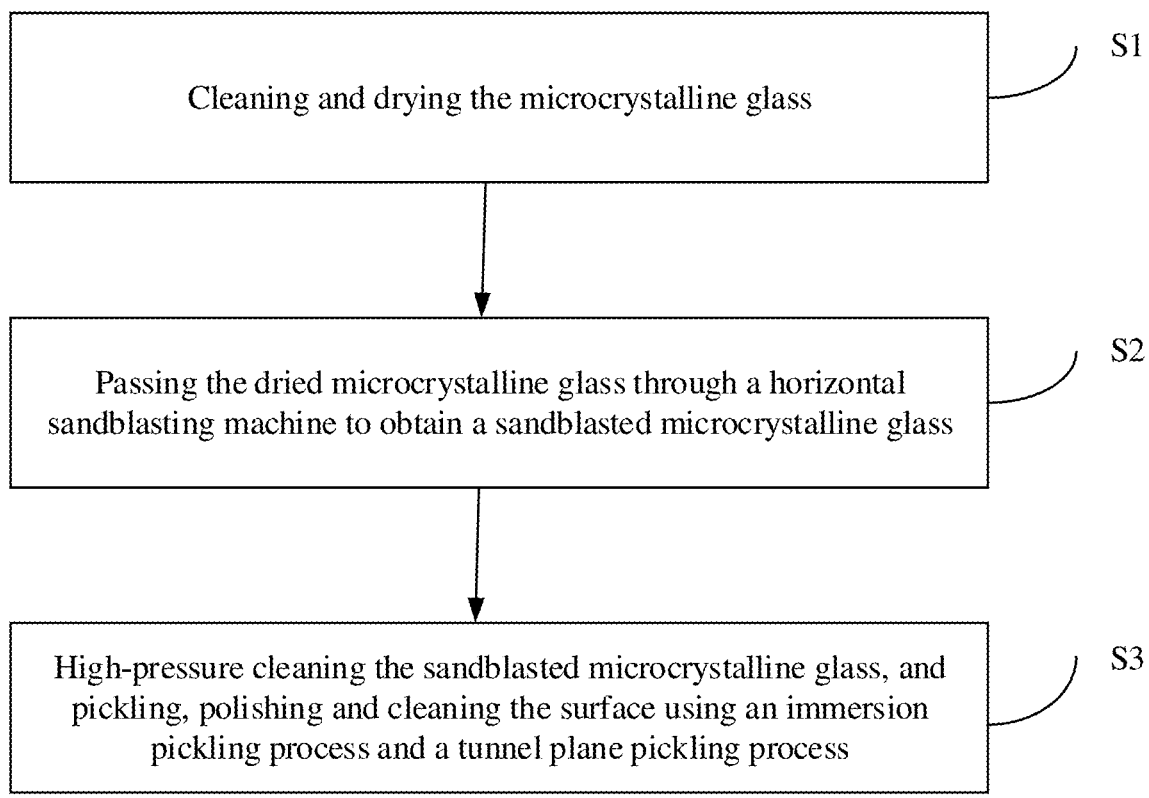
FIG. 1 is a flowchart of a preparation method for scratch-resistant anti-glare (AG) microcrystalline glass according to an embodiment of the present application.

In order to make the purpose, technical solutions and advantages of the embodiments of the present application clearer, the technical solutions in the embodiments of the present application will be clearly and completely described below. It should be understood that the following embodiments are only used to explain the present application and are not used to limit the present application.

Unless otherwise specified, all technical terms and scientific terms used herein have the usual meanings in the field of the claimed subject matter.

It should be noted that if there are directional indications (such as up, down, left, right, front, back, etc.) involved in the embodiments of the present application, the directional indications are only used to explain the relative position relationship and movement of the components in a specific posture. If the specific posture changes, the directional indications will also change accordingly.

In addition, if there are descriptions involving "first", "second", etc. in the embodiments of the present application, the descriptions of "first", "second", etc. are only used for descriptive purposes and cannot be understood as indicating or suggesting their relative importance or implicitly indicating the number of the indicated technical features. Therefore, the features defined as "first" and "second" may explicitly or implicitly include at least one of the features. In addition, "and/or" in the full text includes three parallel solutions, taking "A and/or B" as an example, it includes solution A, or solution B, or a solution that satisfies both A and B. In addition, the technical solutions between the various embodiments can be combined with each other, but such combination must be based on what can be achieved by those skilled in the art. When the combination of technical solutions is contradictory or cannot be implemented, it should be deemed that such combination of technical solutions does not exist and is not within the scope of the present application.

Microcrystalline glass, also known as glass ceramics, is a material with a microcrystalline phase formed by special processing of glass. It combines the advantages of glass and ceramics, such as high mechanical strength, good thermal stability, and chemical corrosion resistance, making it widely used in many fields, especially in the manufacture of high-end home appliances and electronic products. Etched anti-glare (AG) microcrystalline glass technology is a surface treatment process that forms a uniform AG etching coating on the surface of microcrystalline glass by sandblasting and acid etching. The surface of the AG etching coating presents a fine roughness, which helps to scatter reflected light, reduce glare and fingerprints, and maintain high light transmittance. This treatment can significantly improve the surface texture and visual effect of glass-ceramics, reduce direct reflection of light, and provide users with a more comfortable visual experience.

However, the surface scratch resistance of the microcrystalline glass obtained by the current AG microcrystalline glass surface treatment technology is poor.

In order to solve the above problems, the present application proposes a preparation method for the scratch-resistant AG microcrystalline glass, as shown in FIG. 1, including following steps.

S1, cleaning and drying the microcrystalline glass.

In this solution, the microcrystalline glass includes an uncrystallized green wave board and a crystallized board. Cleaning includes placing the microcrystalline glass on the track of a plate washer for cleaning, adjusting the speed of the plate washer to between 2 and 5, then opening the water tap of the plate washer, and turning on the drying switch for drying.

S2, passing the dried microcrystalline glass through a horizontal sandblasting machine to obtain sandblasted microcrystalline glass.

In this solution, the dried microcrystalline glass includes an uncrystallized green wave plate and a crystallized plate. The horizontal glass sandblasting machine is directly driven by a motor, and uses a sandblasting wheel installed on the main shaft to blast the dust-free brown corundum sand on the glass surface at high speed. Compared with sandblasting, it can achieve the effect required by the process more gently.

From the perspective of energy saving, in some embodiments, the average power of a small horizontal glass sandblasting machine is 3.8 kw. A vertical sandblasting machine normally operates three guns and requires a 12 kw air compressor. In addition, the machine itself consumes 3.8 kw of electricity. The vertical sandblasting machine consumes more than 15 kw of electricity per hour. In this way, the horizontal glass sandblasting machine saves 12 kw of electricity than the vertical sandblasting machine. If it works 8 hours a day, it can save electricity (12 kw*8 hours=96 yuan) (the electricity fee is calculated at 1 yuan per 1 kw). It can be concluded that the horizontal glass sandblasting machine can save more than 30,000 yuan in electricity bills per year, which greatly saves costs.

S3, high-pressure cleaning the sandblasted microcrystalline glass, and pickling, polishing and cleaning the surface using an immersion pickling process and a tunnel plane pickling process. The step of "pickling, polishing and cleaning" is repeated 2 to 8 times, and drying to obtain a scratch-resistant AG microcrystalline glass.

In some embodiments, the step of "pickling, polishing and cleaning" is repeated 4 to 6 times.

Further, the drying temperature is 30° C. to 40° C.

In some embodiments of the present application, the drying temperature is any value between 30° C. and 40° C., such as 30° C., 32° C., 34° C., 36° C., 38° C., and 40° C. Drying within this temperature range is conducive to ensuring the surface activity of the microcrystalline glass after contact with the pickling agent during the next surface treatment.

Further, the rotation speed of the horizontal sandblasting machine is 600 rpm to 900 rpm.

The rotation speed of the sandblasting machine affects the speed at which the sand belt contacts the glass, thereby affecting the grinding efficiency and surface quality. In some embodiments of the present application, the rotation speed of the horizontal sandblasting machine is any value between 600 rpm and 900 rpm, such as 600 rpm, 700 rpm, 800 rpm, and 900 rpm.

Furthermore, the step of using the horizontal sandblasting machine includes: using 35-mesh to 45-mesh corundum to sand the surface of the microcrystalline glass for 30 minutes to 40 minutes. The grit number determines the particle size of the sand belt, that is, the size of the abrasive grains on the surface of the sand belt. The grit number of this embodiment is relatively low and is used for rough grinding.

In some embodiments of the present application, the grit number of corundum is any value between 35 and 45 meshes, such as 35 mesh, 40 mesh, and 45 mesh.

Figures 2, 3:
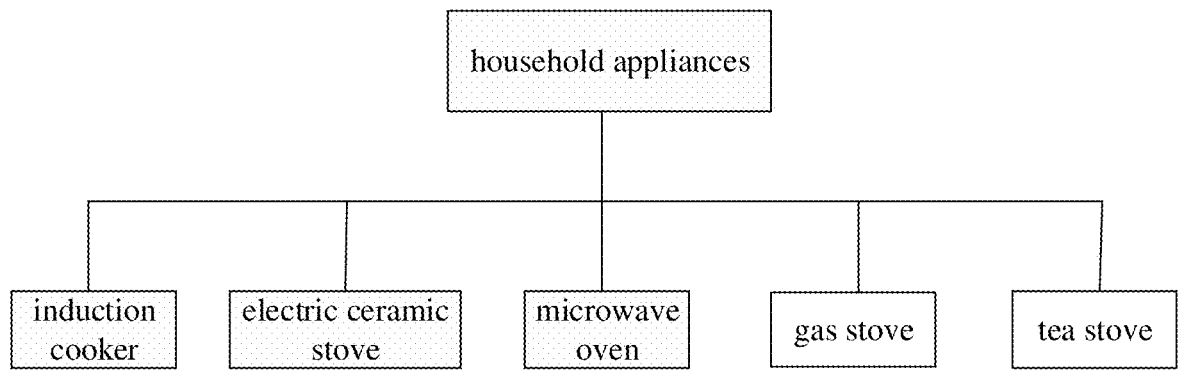
FIG. 2 is a step included in the preparation method for scratch-resistant AG microcrystalline glass according to an embodiment of the present application.
FIG. 3 is example usage of a scratch-resistant AG microcrystalline glass according to the present application.

Furthermore, as shown in FIG. 2, the pickling and polishing includes step S31: spraying, via the pickling device, the reagent on the surface of the microcrystalline glass, and polishing the microcrystalline glass. In an embodiment, the adjusted reaction reagent is sprayed onto the surface of the microcrystalline glass using the automatic horizontal spraying and friction method of the professional pickling device, and the equipment transfers the microcrystalline glass to the reagent reaction area for polishing. Pickling and polishing can significantly improve the surface properties of the microcrystalline glass, including reducing surface roughness, eliminating tiny cracks and defects, and thus improving the optical and mechanical properties of the material.

Furthermore, the reagents used in the pickling and polishing include, by weight: 20-30 parts of water, 15-25 parts of ammonium sulfate, 20-30 parts of barium sulfate, 12-16 parts of oxalic acid, and 15-18 parts of ammonium acetofluoride.

In some embodiments, the pickling and polishing reagents also include hydrofluoric acid and chromic acid. After the microcrystalline glass passes through the pickling reaction reagent, hydrofluoric acid (HF) in the reaction reagent reacts with silicon dioxide ($SiO_2$), the main component of the microcrystalline glass. The reaction formula is as follows: $SiO_2 + 6HF \rightarrow H_2SiF_6 + 2H_2O SiO_2 + 6HF \rightarrow H_2SiF_6 + 2H_2O$. In this reaction, $SiO_2$ reacts with HF to generate hexafluorosilicic acid ($H_2SiF_6$) and water. Since hexafluorosilicic acid is in liquid form, it can be dissolved in an acidic solution and will not leave solid residues on the surface of the glass, thereby avoiding surface contamination during the reaction. Since microcrystalline glass also contains other metal oxides (such as boron, aluminum, lithium, etc.), these components will also react with hydrofluoric acid accordingly. The microcrystalline glass containing aluminum may undergo the following reaction: $Al_2O_3 + 6HF \rightarrow 2AlF_3 + 3H_2O Al_2O_3 + 6HF \rightarrow 2AlF_3 + 3H_2O$.

The above pickling reagent, in combination with the polishing process of this solution, can be used to coordinately treat the surface of the microcrystalline glass to achieve a higher wear resistance.

Further, the spraying is achieved by a pump, and a pressure of the pump is 0.2 Mpa~0.5 Mpa.

Spraying the pickling reagent within the above pressure range can achieve uniform and efficient spraying and avoid damage to the surface of the microcrystalline glass. In some embodiments, the pressure of the pump is any value between 0.2 Mpa and 0.5 Mpa, such as 0.2 Mpa, 0.3 Mpa, 0.4 Mpa, and 0.5 Mpa.

Furthermore, the grinding time is 6 minutes to 8 minutes. In some embodiments, the grinding time is any value between 6 minutes and 8 minutes, such as 6 minutes, 7 minutes, 8 minutes. In some embodiments, the cleaning reagent used in the cleaning step after grinding includes plasma water, sodium carbonate and sodium polyphosphate, and the obtained glass does not need to be specially cleaned, but only needs to be passed through an ordinary plate washer.

In order to solve the above problems, the present application also proposes a scratch-resistant AG microcrystalline glass prepared by the above preparation method. The scratch-resistant AG microcrystalline glass has no burrs, excellent surface mechanical properties, and is not easy to be scratched or worn.

To solve the above problems, the present application also proposes an application of scratch-resistant AG microcrystalline glass, which is applied to household appliances, as shown in FIG. 3, including one of an induction cooker, an electric ceramic cooker, a microwave oven, a gas stove, and a tea stove. The microcrystalline glass of this solution is suitable for manufacturing a stove panel due to its wear resistance, corrosion resistance, and high temperature resistance, and can be directly heated on the table for cooking.

Example 1 placing the microcrystalline glass (including the uncrystallized green wave plate and the crystallized plate) on the track of the plate washer for cleaning, adjusting a speed of the plate washer to between 2 and 5, opening the water tap of the plate washer, and turning on the drying switch for drying, the drying temperature is 35° C.;

passing the dried microcrystalline glass (including the uncrystallized green wave plate and the crystallized plate) through the horizontal sandblasting machine, the rotation speed of the horizontal sandblasting machine is 800 rpm; and using 40 mesh corundum to sandblast the surface of the microcrystalline glass for 40 minutes to obtain the sandblasted microcrystalline glass; and high-pressure cleaning the sandblasted microcrystalline glass, and pickling, polishing and cleaning the surface using an immersion pickling process and a tunnel plane pickling process. The pickling device sprays the reagent on the surface of the microcrystalline glass, and then polishing the microcrystalline glass. The spraying is achieved by a pump with a pressure of 0.2 Mpa. The reagents used include: 25 parts of water, 20 parts of ammonium sulfate, 25 parts of barium sulfate, 15 parts of oxalic acid and 17 parts of ammonium acetofluoride. The polishing time is 7 minutes, then the step of "pickling, polishing and cleaning" is repeated 6 times, and drying is performed to obtain scratch-resistant AG microcrystalline glass.

Example 2 placing the microcrystalline glass (including the uncrystallized green wave plate and the crystallized plate) on the track of the plate washer for cleaning, adjusting the speed of the plate washer to between 2 and 5, opening the water tap of the plate washer, and turning on the drying switch for drying, the drying temperature is 35° C.;

passing the dried microcrystalline glass (including the uncrystallized green wave plate and the crystallized plate) through the horizontal sandblasting machine, the rotation speed of the horizontal sandblasting machine is 800 rpm, and using 35 mesh corundum to sandblast the surface of the microcrystalline glass for 40 minutes to obtain the sandblasted microcrystalline glass; and high-pressure cleaning the sandblasted microcrystalline glass, and pickling, polishing and cleaning the surface using an immersion pickling process and a tunnel plane pickling process. The pickling device sprays the reagent on the surface of the microcrystalline glass, and polishes the microcrystalline glass. The spraying is achieved by a pump with a pump pressure of 0.2 Mpa.

The reagents used include: 25 parts of water, 15 parts of ammonium sulfate, 30 parts of barium sulfate, 15 parts of oxalic acid and 18 parts of ammonium acetofluoride. The polishing time is 8 minutes, the step of "pickling and polishing and cleaning" is repeated 4 times, and then drying is performed to obtain scratch-resistant AG microcrystalline glass.

Example 3 placing the microcrystalline glass (including the uncrystallized green wave plate and the crystallized plate) on the track of the plate washer for cleaning, adjusting the speed of the plate washer to between 2 and 5, opening the water tap of the plate washer, and turning on the drying switch for drying, the drying temperature is 35° C.;

passing the dried microcrystalline glass (including the uncrystallized green wave plate and the crystallized plate) through the horizontal sandblasting machine, the rotation speed of the horizontal sandblasting machine is 800 rpm, and using 35 mesh corundum to sandblast the surface of the microcrystalline glass for 40 minutes to obtain the sandblasted microcrystalline glass; and high-pressure cleaning the sandblasted microcrystalline glass, and pickling, polishing and cleaning the surface using an immersion pickling process and a tunnel plane pickling process. The pickling device sprays the reagent on the surface of the microcrystalline glass, and polishes the microcrystalline glass. The spraying is achieved by a pump with a pump pressure of 0.2 Mpa. The reagents used include: 25 parts of water, 15 parts of ammonium sulfate, 30 parts of barium sulfate, 15 parts of oxalic acid and 18 parts of ammonium acetofluoride. The polishing time is 8 minutes, the step of "pickling, polishing and cleaning" is repeated 4 times, and drying is performed to obtain scratch-resistant AG microcrystalline glass.

Example 4 placing the microcrystalline glass (including the uncrystallized green wave plate and the crystallized plate) on the track of the plate washer for cleaning, adjusting the speed of the plate washer to between 2 and 5, opening the water tap of the plate washer, and turning on the drying switch for drying, the drying temperature is 40° C.;

passing the dried microcrystalline glass (including the uncrystallized green wave plate and the crystallized plate) through the horizontal sandblasting machine, the rotation speed of the horizontal sandblasting machine is 800 rpm, and using 35 mesh corundum to sandblast the surface of the microcrystalline glass for 40 minutes to obtain the sandblasted microcrystalline glass; and high-pressure cleaning the sandblasted microcrystalline glass, and pickling, polishing and cleaning the surface using an immersion pickling process and a tunnel plane pickling process. The pickling device sprays the reagent on the surface of the microcrystalline glass, and polishes the microcrystalline glass. The spraying is achieved by a pump with a pressure of 0.5 MPa. The reagents used include: 20 parts of water, 15 parts of ammonium sulfate, 20 parts of barium sulfate, 12 parts of oxalic acid and 18 parts of ammonium acetofluoride. The polishing time is 6 minutes, the step of "pickling, polishing and cleaning" is repeated 8 times, and drying is performed to obtain scratch-resistant AG microcrystalline glass.

Comparative Example 1 placing the microcrystalline glass on the track of the plate washer for cleaning, adjusting the speed of the plate washer to between 2 and 5, opening the water tap of the plate washer, and turning on the drying switch for drying, the drying temperature is 40° C.;

passing the dried microcrystalline glass through the vertical sandblasting machine to obtain the sandblasted microcrystalline glass; and pickling, polishing and cleaning the sandblasted microcrystalline glass. The pickling device sprays the reagent on the surface of the microcrystalline glass, and polishes the microcrystalline glass. The spraying is achieved by a pump with a pressure of 0.5 Mpa. The reagents used include: 30 parts of water, 25 parts of ammonium sulfate, 20 parts of barium sulfate, 10 parts of oxalic acid and 30 parts of ammonium acetofluoride. The polishing time is 6 minutes, the steps of "pickling, polishing and cleaning" are repeated 5 times, and drying is performed to obtain scratch-resistant AG microcrystalline glass.

Furthermore, the microcrystalline glass finally prepared in Examples 1 to 4 and Comparative Example 1 were used for performance testing, including Mohs hardness, water drop angle and wear resistance. The results are shown in Table 1 below:

TABLE 1

| | Mohs hardness | water drop angle | wear resistance |
|---|---|---|---|
| Example 1 | 8 H | 116.920 | 0 |
| Example 2 | 8 H | 118.380 | 0 |
| Example 3 | 8 H | 115.443 | 0 |
| Example 4 | 8 H | 117.567 | 0 |
| Comparative Example 1 | 6.5 H | 78.567 | 90% |

According to the above table, the process of this solution has following advantages: 1. Improved hardness performance of microcrystalline glass: the Mohs hardness of the surface of microcrystalline glass without pickling and polishing is 6.5H, while Mohs hardness test of the surface of microcrystalline glass after sanding, pickling and polishing is 8H. This indicates an increase in surface hardness and scratch resistance. 2. Improved water drop angle of microcrystalline glass: the water drop angle of the surface of microcrystalline glass without sanding, pickling and polishing is 78.567 in the water drop test, while the average water drop angle of the surface of microcrystalline glass after sanding, pickling and polishing is 117.0775; the overall water drop angle greater than 110° is considered optimal. 3. Improved wear resistance of microcrystalline glass: when subjected to repeated friction with a clean steel wool ball, 9 out of 10 microcrystalline glass samples showed scratches. In contrast, none of the 10 microcrystalline glass samples treated with sandblasting and acid polishing showed any scratches after the same test. This solution adopts the horizontal sandblasting machine and the polishing process, along with specially formulated pickling reagents, to treat the surface of raw microcrystalline glass. The resulting glass exhibits enhanced scratch resistance, wear resistance, and fingerprint resistance, which can be used in the panel of household appliances without being scratched, and greatly saves the preparation cost.

The above description are only embodiments of the present application, and do not limit the scope of the present application. For those skilled in the art, various changes and modifications can be made to the present application. Any modifications, equivalent substitutions, improvements, etc. made within the spirit and principles of the present application should be included in the scope of the present application.

What is claimed is:

1. A preparation method for scratch-resistant anti-glare (AG) microcrystalline glass, comprising:
    cleaning and drying a raw sheet of microcrystalline glass;
    passing the dried microcrystalline glass through a horizontal sandblasting machine to obtain a sandblasted microcrystalline glass; and
    pickling, polishing and cleaning the sandblasted microcrystalline glass, repeating the pickling, polishing and cleaning 2 to 8 times, and drying, to obtain a scratch-resistant AG microcrystalline glass, wherein a time for each polishing of the pickling, polishing and cleaning is 6 minutes to 8 minutes,
    wherein the pickling, polishing and cleaning the sandblasted microcrystalline glass comprises: spraying, via a pickling device, a reagent on a surface of the microcrystalline glass, polishing the microcrystalline glass, and cleaning the sandblasted microcrystalline glass,
    the reagent comprises: in parts by weight, 20 to 30 parts of water, 15 to 25 parts of ammonium sulfate, 20 to 30 parts of barium sulfate, 12 to 16 parts of oxalic acid and 15 to 18 parts of ammonium acetyl fluoride.

2. The preparation method for the scratch-resistant AG microcrystalline glass of claim 1, wherein a drying temperature of the drying step is 30° C. to 40° C.

3. The preparation method for the scratch-resistant AG microcrystalline glass of claim 1, wherein a rotation speed of the horizontal sandblasting machine during the horizontal sandblasting of the dried microcrystalline glass is 600 rpm to 900 rpm.

4. The preparation method for the scratch-resistant AG microcrystalline glass of claim 1, wherein the passing the dried microcrystalline glass through the horizontal sandblasting machine to obtain the sandblasted microcrystalline glass comprises: using 35-mesh to 45-mesh corundum to sand a surface of the microcrystalline glass for 5 minutes to 10 minutes.

5. The preparation method for the scratch-resistant AG microcrystalline glass of claim 1, wherein the spraying is achieved by a pump using a pressure of 0.2 Mpa to 0.5 Mpa.

6. The preparation method for the scratch-resistant AG microcrystalline glass of claim 1, wherein the cleaning and drying the raw sheet of microcrystalline glass comprises:
    cleaning and drying the raw sheet of microcrystalline glass, and polishing the raw sheet of microcrystalline glass and performing edge grinding on the raw sheet of microcrystalline glass before the cleaning and drying the raw sheet of microcrystalline glass.

7. The preparation method for the scratch-resistant AG microcrystalline glass of claim 1, wherein the raw sheet of microcrystalline glass comprises an uncrystallized green wave plate and a crystallized plate.

8. A scratch-resistant AG microcrystalline glass, comprising the scratch-resistant AG microcrystalline glass prepared by the preparation method of claim 1.

9. Use of the scratch-resistant AG microcrystalline glass of claim 8 in household appliances, and the household appliances comprise one of an induction cooker, an electric ceramic stove, a microwave oven, a gas stove, and a tea stove.

* * * * *